United States Patent [19]

Saran

[11] 4,092,677
[45] May 30, 1978

[54] TRUNCATED RUN LENGTH ENCODING FOR FRACTIONALLY DIFFERENCE MODULATED VIDEO SIGNALS

[75] Inventor: Amitabh Saran, Cypress, Calif.
[73] Assignee: Xerox Corporation, Stamford, Conn.
[21] Appl. No.: 756,662
[22] Filed: Dec. 29, 1976
[51] Int. Cl.² .............................................. H04N 7/12
[52] U.S. Cl. .............................. 358/261; 340/347 DD
[58] Field of Search .............................. 358/260, 261; 340/347 DD

[56] References Cited

U.S. PATENT DOCUMENTS

| | | | |
|---|---|---|---|
| 3,830,964 | 8/1974 | Spencer | 358/261 |
| 3,916,095 | 10/1975 | Weber | 358/261 |
| 3,937,871 | 2/1976 | Robinson | 358/261 |
| 3,984,833 | 10/1976 | Van Voorhis | 340/347 DD |

Primary Examiner—Howard W. Britton

[57] ABSTRACT

A binary video signal having a raster scan format is fractionally difference modulated to limit the inter-scan line propagation of decoding errors. The fractionally difference modulated video signal is then encoded using different end-of-line message codes to distinguish between unterminated white runs of difference modulated and unmodulated picture elements, thereby providing a scan line-by-scan line indication of whether the picture elements are difference modulated or not and avoiding the need for distinguishing between the difference modulated and unmodulated picture elements while converting black terminated white runs and non-terminating black picture elements into run length message codes and individual message bits, respectively.

9 Claims, 4 Drawing Figures

TRUNCATED RUN LENGTH ENCODING FOR FRACTIONALLY DIFFERENCE MODULATED VIDEO SIGNALS

CROSS REFERENCE TO RELATED APPLICATIONS

Related, commonly assigned and concurrently filed United States Patent Applications are Ser. No. 755,309 on "Block Length Multiple Plus Run Length Codes for Run Length Coding"; Ser. No. 755,313 on "Method and Means for Extracting Variable Length Data from Fixed Length Bytes"; Ser. No. 756,663 on "Truncated Run Length Encoding With a Modular Variable Code Format"; and Ser. No. 756,664 on "Truncated Run Length Encoding".

BACKGROUND OF THE INVENTION

This invention relates to data compression for imaginal data processing systems and, more particularly, to digital data compression for binary raster scanned imaging systems and the like.

Documents (e.g., printed and written pages, drawings, and photographs) essentially are more or less continuous, two dimensional patterns of reflectance. Accordingly, imaginal data processing systems classically include raster input scanners for serially remapping or converting the information content (i.e., graphic images) of input documents into corresponding, one dimensional video signals and raster output scanners for serially printing replicas or facsimiles of the input documents in response to the video signals. There are hybrid systems in which provision is made for converting to or from a raster scan video signalling format so that raster input and output scanners may be interfaced with devices having other signalling formats, such teletypewriter terminals using an ASCII code. Usually, however, raster input and output scanners are employed in complementary combinations to form so-called raster scanned imaging systems.

Raster input and output scanning feature a characteristic scan structure, whereby a graphic image is represented by a video signal containing a predetermined number of picture elements (sometimes referred to as "pixels") for each of a plurality of substantially equidistantly spaced scan lines. Thus, the resolution of a raster scanner is customarily expressed in terms of a given number of scan lines/inch along, say, a vertical axis by a given number of picture elements or line pairs/inch along an orthogonal or horizontal axis. For example, the Xerox 200 Telecopier facsimile transceiver, which is manufactured and sold by Xerox Corporation, offers a choice of speed dependent resolutions which are conventionally specified (with reference to nominal document transmission times for a standard 8½ inch × 11 inch document) in units of scan lines/inch vertically by picture elements/inch horizontally as being approximately: 96 × 96 for document transmission times of 3 and 6 minutes; 64 × 96 for a document transmission time of 4 minutes; and 77 × 80 for a document transmission time of 2 minutes. While those are more or less standard resolutions for existing facsimile systems, it should be understood that they are close to the lower end of the useful range of resolutions for raster scanners in general. Significantly coarser resolutions are normally avoided because they involve an unacceptably high risk of losing essential image detail.

Raw video signals of the foregoing type commonly contain a significant amount of reduntant information. Therefore, if a video circuit for a raster input or output scanner comprises a limited bandwidth transmission medium or a limited capacity storage medium, increased data handling efficiency can often be realized by including an upstream data compression stage for removing redundant information from the video signal and a downstream data decompression stage for restoring that information. Binary video signals are especially well suited to data compression and decompression because the picture elements are either black or white ("1" or "0"), thereby excluding all intermediate shades of gray. For that reason, substantial effort and expense have been devoted to the development of digital data compression and decompression methods and means.

Run length encoding and decoding have gained widespread attention as techniques for compressing and decompressing, respectively, binary video signals having a raster scan format. Basically, the encoding converts the white and/or black runs of a binary video signal into corresponding message codes, and the decoding reconverts those codes into white and/or black runs of the appropriate length to reconstruct the video signal. In that context, a "run" is defined as being an uninterrupted series of one or more picture elements at the same logic level, and the "length" of a run is determined by the number of picture elements therein.

To carry out the encoding, the message codes are preselected to uniquely identify the lengths of the encoded runs. Preferably, in keeping with the teachings of D. A. Huffman, "A Method for the Construction of Minimum - Redundancy Codes," *Proceedings of the I.R.E.*, September 1952, pp. 1098–1101, the message codes are of variable length (i.e., different bit counts) and are assigned to the run lengths which are to be encoded in accordance with a predetermined run length probability distribution to the end that the code assigned to a given run length is no longer than the code assigned to a less probable run length.

Unfortunately, however, an unbounded set of documents does not yield a meaningful run length probability distribution because the redundancy of all graphic images, as an unlimited class, is completely random. Thus, to take advantage of a run length probability distribution in assigning the message codes, it is necessary to focus on a subset of documents which share a common image characteristic. For example, to optimize the data compression provided for ordinary business correspondence, the run length probability distribution may be based on run length frequency statistics gathered by prescanning a relatively few sample documents composed primarily of alphanumeric characters. Of course, that subset still permits of sufficient variations in page coverage and formatting and in character size and style to warrant weighting the run length frequency statistics in favor of those samples which are subjectively judged to most closely approach a preconceived norm.

Others have recognized that the basic run length encoding process can be modified to achieve increased data compression. In general, the proposed modifications have been directed toward increasing the average length of the runs which are presented for encoding.

More particularly, H. E. White et al., "Dictionary Look-Up Encoding of Graphic Data," *Picture Bandwidth Compression*, ed. T. S. Huang, Gordon and Breach, 1972, pp. 267–281, suggest the encoding of the "derivative or transitional equivalent" of the original image. To accomplish that, the definition of a run is expanded to include not only an uninterrupted series of picture elements of one logic level, but also a single terminating picture element of the opposite logic level.

Another interesting proposal relates to a pre-encoding process known as difference modulation. To perform that process, corresponding picture elements for successive scan lines are differentially compared, thereby generating a binary prediction signal (hereinafter referred to as a difference modulated video signal) which distinguishes the picture elements for the later scan line which are at the same logic level as the corresponding picture elements for the preceding scan line from those that are not. Run length encoding of the difference signal can usually be carried out with relatively few message code bits because there normally is sufficient inter-scan line redundancy to cause the difference signal to have relativey long runs at a logic level indicating that the picture elements for the two scan lines are the same. However, there is the risk that errors made in recovering the picture elements for one scan line will be propagated through subsequent scan lines. Consequently, to limit the propagation of those errors, it is desirable to periodically encode and decode a scan line of raw or unmodulated picture elements, such as suggested in U.S. Pat. No. 3,830,966 of W. H. Aldrich et al., which issued Aug. 30, 1974, for "Apparatus and Method for Transmitting a Bandwidth Compressed Digital Signal Representation of a Visible Image."

SUMMARY OF THE INVENTION

Against that background, the primary goal of this invention is to provide improved methods and means for compressing binary video signals having a raster scan format.

More pointedly, in keeping with one aspect of the present invention, an object is to provide truncated run length encoding methods and means for converting terminated runs into run length message codes and unterminated runs into end of line message codes. A related object is to provide truncated run length encoding methods and means for encoding scan lines of difference modulated and unmodulated picture elements.

In keeping with another aspect of this invention an object is to provide methods and means for reducing the number of unique message codes required for run length encoding. A more detailed object is to provide methods and means for generating modular block length multiple plus residue run length message codes.

In keeping with still another aspect of this invention, a further object is to provide methods and means for extracting variable length data from fixed length bytes. A more specific, related object is to provide methods and means for taking advantage of a word oriented memory to store a look-up table of tree-type message codes for a run length encoder.

Briefly, to carry out these and other aspects of the invention, the picture elements of a binary video signal having a raster scan format are serially applied to a difference modulator which is cyclically enabled and disabled to sequentially feed scan lines of difference modulated and unmodulated picture elements to a truncated run length encoder where terminated runs are converted into run length message codes and unterminated runs are converted into end of line message codes. The same run length message codes are employed to encode the terminated runs of modulated and unmodulated picture elemments, but there are different end of line message codes to signal whether difference demodulation of the scan line is or is not necessary to reconstruct the video signal. To limit the number of unique message codes required for encoding terminated runs, the run length message codes have a modular structure so that those runs are represented by block length multiple codes, if in excess of a predetermined block length, plus run length residue codes, if not an integer multiple of the block length.

BRIEF DESCRIPTION OF THE DRAWINGS

Still further objects and advantages of this invention will become apparent when the following detailed description is read in conjunction with the attached drawings, in which.

DETAILED DESCRIPTION OF THE ILLUSTRATED EMBODIMENT

While the various aspects of this invention are described in some detail hereinbelow with specific reference to a single exemplary embodiment, it should be clearly understood that there is no intent to limit it to that embodiment. On the contrary, the aim is to cover all modifications, alternatives, and equivalents falling within the spirit and scope of the invention as defined by the appended claims.

Figure 1:
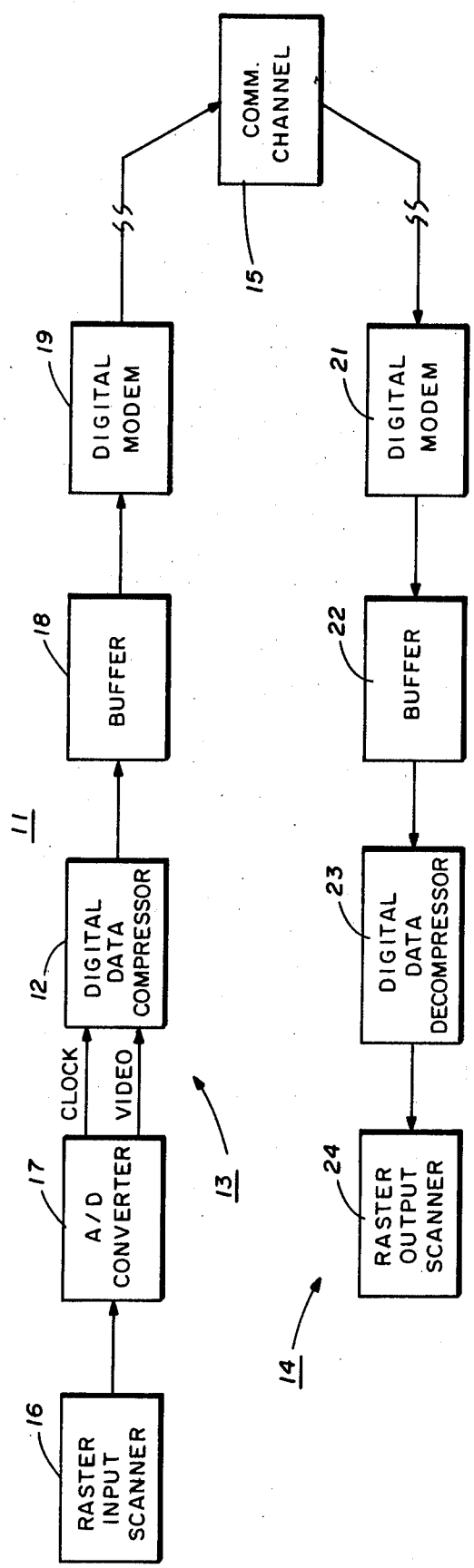
FIG. 1 is a functional block diagram of a digital facsimile system in which a data compressor embodying this invention may be used to substantial advantage.

Turning now to the drawings, and at this point especially to FIG. 1, there is a imaginal data processing system II including a digital data compressor 12 for compressing raster scan formatted, binary video signals in accordance with this invention. As shown, the data processing system II is a raster scanned imaging system or, even more specifically, a digital facsimile system having a transmitting terminal 13 and a receiving terminal 14 which are interconnected on, say, a demand basis by a communications link 15. Typically, the communications link 15 is a limited bandwidth transmission channel furnished by the public switched telephone network.

Reviewing the transmitting terminal 13 on a functional level, there is a raster input scanner 16 for converting the information content of an original document (i.e., a "subject copy") into a corresponding video signal. An analog-to-digital converter 17 samples that signal at a predetermined rate in response to internally generated clock pulses and quantizes those samples, thereby providing a raw binary video signal having a raster scan format to represent the information content of the subject copy. As a practical example, it will be assumed that the scan pitch of the input scanner 16 and the sampling rate of the analog-to-digital converter 17 are selected to achieve a resolution of 96 scan lines/inch vertically by 204 picture elements/inch horizontally. Under those circumstances, the scanning of a standard 8½ inch × 11 inch document provides a binary video signal having 1,728 picture elements/scan line for 1,056 scan lines or, in other words, a total of 1,824,768 picture elements/page. Typically, however, a substantial portion of those picture elements merely represent redundant information.

Accordingly, to reduce the redundancy, the binary video signal is encoded by the digital data compressor 12 to provide an encoded, data compressed video signal which is fed through a speed matching buffer 18 to a digital modem 19. A suitable carrier signal is modulated in accordance with the encoded video signal by the modem 19 to supply a passband signal for transmission to the receiving terminal 14 via the communications channel 15. As will be appreciated, the buffer 18 is included to isolate the modem 19 from the upstream components of the transmitting terminal 13 so that the passband data transmission rate may be selected more or less independently of the input scanning/sampling rate.

At the receiving terminal 14, there is a complementary modem 21 for demodulating the incoming passband signal, thereby recovering the encoded video signal. That signal is, in turn, fed through an appropriate speed matching buffer 22 to digital data decompressor 23 which performs the decoding necessary to reconstruct the raw binary video signal. A raster output scanner 24 then prints a replica or "facsimile" of the subject copy in response to the reconstructed video signal.

Figure 2:
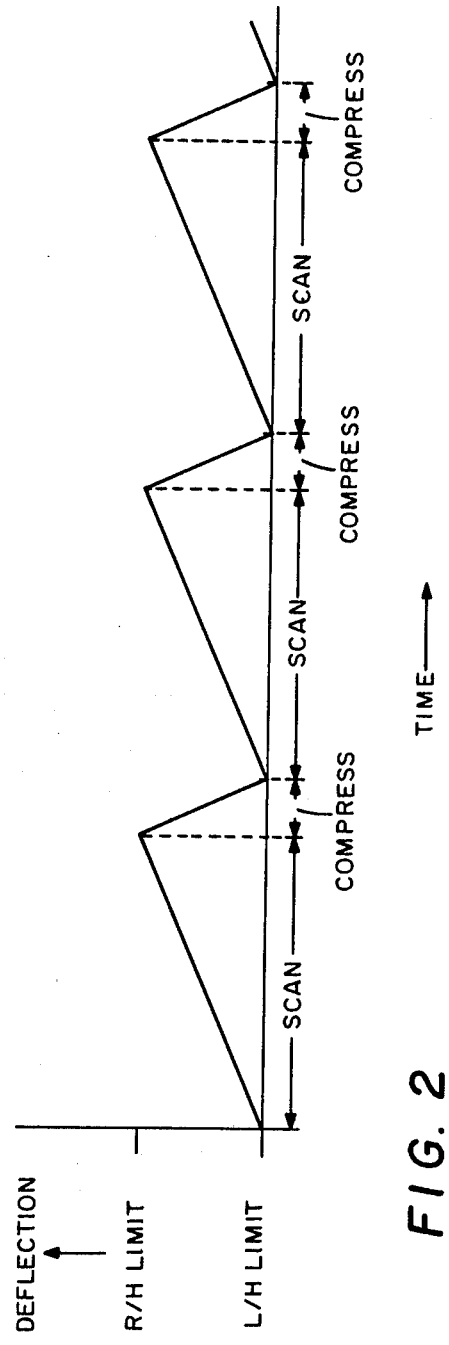
FIG. 2 is a basic timing diagram for a typical raster input scanner for the system shown in FIG. 1.

As shown in FIG. 2, in keeping with accepted practices, the input scanner 16 cyclically scans the subject copy scan line-by-scan line. Preferably, each scanning cycle is sequenced so that the scanner 16 first actively scans across the subject copy in one direction (say, from left-to-right) and then passively returns or flies back in the opposite direction to prepare for the next cycle. An input/output scanner of that type is used in the aforementioned Xerox 200 Telecopier facsimile transceiver and is disclosed in a commonly assigned U.S. Pat. No. 3,869,569 which issued Mar. 4, 1975, to Peter J. Mason et al. for "Facsimile Transceiving Apparatus." Hence, that patent and the foregoing commercially available equipment are hereby incorporated by reference. Nevertheless, in the interest of completeness, it is noted that the above-identified scanner comprises a laser which is optically aligned with a scan mirror of a galvanometer-type deflection mechanism. Thus, when the scanner is operating in a scan mode, the scan mirror is cyclically oscillated to sweep back and forth across a laterally elongated scanning aperture, and the laser is activated and extinguished in timed synchronism with the oscillation of the scan mirror to selectively provide a light beam for illuminating the subject copy while the scan mirror is sweeping from left-to-right across the scanning aperture, but not while the scan mirror is flying back in the opposite or right-to-left direction. The subject copy is incrementally advanced longitudinally of the scanning aperture, thereby cooperating with the scan mirror in providing the orthogonal motion necessary to create a raster scanning pattern.

Figure 3:
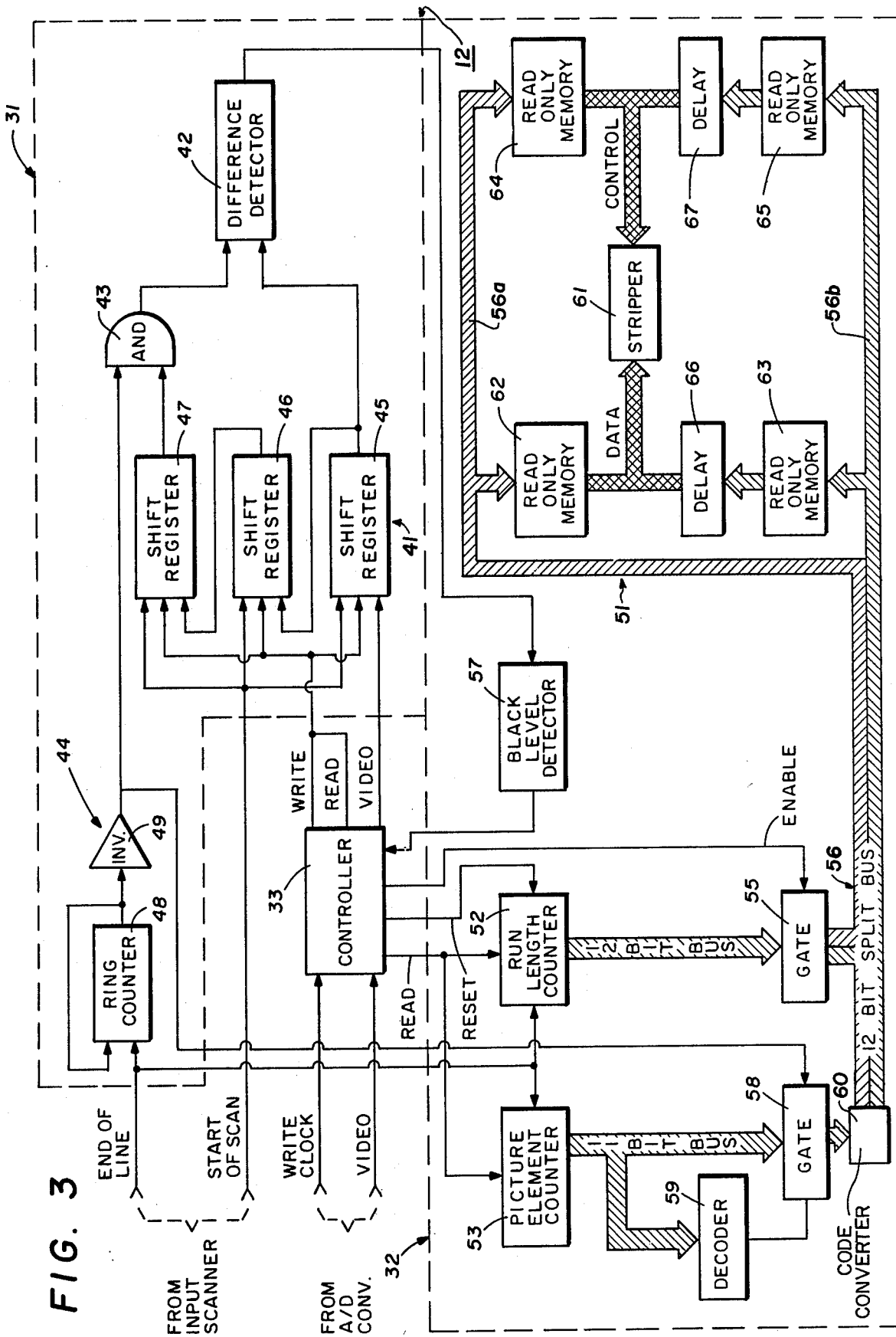
FIG. 3 is a more detailed functional block diagram of a digital data compressor constructed in accordance with the present invention.

Referring to FIG. 3, the digital data compressor 12 includes a difference modulator 31 and a truncated run length encoder 32 which are controlled by a controller 33 to accumulate and encode the binary picture elements for consecutive scan lines during the active and passive portions, respectively, of successive scanning cycles. As will be seen, provision is made for periodically enabling and disabling the difference modulator 31 so that the encoding of scan lines of difference modulated picture elements is regularly interrupted to allow for the encoding of at least one scan line of unmodulated picture elements, thereby limiting the inter-scan line propagation of decoding errors. The encoder 32, on the other hand, features a modular run length message code structure for the encoding of "black terminated white runs" of delta modulated and unmodulated picture elements and a truncated run length encoding process characterized by the use of different, run length independent, end of line message codes to represent unterminated white runs of difference modulated and unmodulated picture elements.

"Black" and "white" are used herein as convenient terms for distinguishing between difference modulated and unmodulated picture elements of opposite logic levels (i.e., "1" and "0"). However, the only color significance those terms are intended to imply is that raw or unmodulated black and white picture elements represent image and background information, respectively. Even that limited correlation is lacking in the case of difference modulated picture elements because that modulation attaches an error significance to the logic levels of those picture elements.

More particularly, as shown, the difference modulator 31 comprises a serial input/parallel output shift register means 41 for sequentially feeding spatially corresponding picture elements for successive pairs of adjacent scan lines in parallel to a difference detector 42. The picture elements for one scan line of each of those pairs are directly applied to a first input of the detector 42. Advantageously, however, to limit the inter-scan line propogation of decoding errors, the picture elements for the other scan line are gated to a second input of the detector 42 via an AND gate 43 which is periodically disabled by a self-resetting line counter 44. When the AND gate 43 is enabled, the detector 42 generates a binary signal representing the modulo-2 difference between the two adjacent scan lines. In contrast, when the gate 43 is disabled, the difference detector 42 passes the raw picture elements for the ungated or current scan line in unmodulated form.

Concentrating first on the shift register means 41, it will be seen that the raw binary picture elements supplied by the analog-to-digital converter 17 are serially shifted through the shift register means 41 in response to write and read clock pulses which are applied to one or more clock inputs for the shift register means 41 by the controller 33 during the active and passive portions, respectively, of each scanning cycle. Thus, to supply a parallel flow of spatially corresponding picture elements for a current and an immediately preceding scan line, the shift register means 41 includes 3n serially connected stages, where "n" equals the number of picture elements/scan line, and parallel outputs are taken from the n th and the 3n th stages. Suitably, the write clock pulses for the shift register means 41 are derived from the analog-to-digital converter 17, but provision is made for generating the read clock pulses internally of the controller 33.

While a single multi-stage register could be configured to perform the above-described process, it is somewhat easier to trace the flow of picture elements if the shift register means 41 is visualized as being formed from three serially connected, line length or n-stage shift registers 45–47. At the outset of each scanning operation, all of the stages of the shift registers 45–47 are, of course, cleared to a low ("0") logic level in response to, say, a start of scan signal received from the input scanner 16. Thereafter, the raw binary picture elements for an initial scan line are serially shifted into the n-stages of the first shift register 45 in response to the write clock pulses provided during the active portion of a first scanning cycle. Those picture elements are subsequently shifted through the n-stages of the second shift register 45 and into the n-stages of the third shift register 47 as a result of the read clock pulses and the additional write clock pulses furnished during the passive portion of the first scanning cycle and during the active portion of a second scanning cycle, respectively. Furthermore, the raw binary picture elements for the next scan line are serially loaded into the n-stages of the first shift register 45 in response to the write clock pulses supplied during the active portion of the second scanning cycle. Picture elements provided during later scanning cycles follow the same path. Thus, it will be understood that spatially corresponding, raw binary picture elements for a current and an immediately preceding scan line are fed in parallel from the final stages of the shift registers 45 and 47, respectively, in response to the read clock pulses supplied during the passive portion of each scanning cycle, except the first. The first cycle is an exception simply because there are no picture elements for a preceding scan line at that time which means that the n-stages of the thid shift register 47 remain at a low ("0") logic level throughout that cycle.

At this point it may be helpful to mention that "spatially corresponding" is used herein as a convenient description for picture elements which occupy the same relative positions in different scan lines. In the context of a one-dimensinal video signal, spatially corresponding picture elements occupy identical numerical positions in separate scan lines. Similarly, in the context of a two-dimensional subject copy, spatially corresponding picture elements represent the information content of spaced apart areas of the subject copy which are aligned in the scan pitch direction. For example, if the scan pitch is measured vertically of the subject copy, spatially corresponding picture elements represent the information content of vertically aligned areas of the subject copy.

Inter-scan line redundance characteristically results in a statistically significant degree of duplication between spatially corresponding binary picture elements for adjacent scan lines. Hence, to obtain white or low ("0") logic level runs of increased average length, the difference detector 42 is included for transforming certain of the scan lines of raw binary picture elements into scan lines of difference modulated picture elements representing the modulo-2 difference between spatially corresponding binary picture elements for the scan line being transformed and the immediately preceding scan line. As will be appreciated, the increased average run length tends to reduce the number of bits required to convey a given amount of information in run length encoded form or, in other words, provides an opportunity for achieving increased data compression. Nevertheless, thee is an attendant risk that errors made in decoding the picture elements for one scan line will propagate through all subsequent difference modulated scan lines. That follows from the fact that the recovery of the binary video signal depends on a complementary difference demodulation process - viz., a modulo-2 summation of the difference modulated picture elements for the scan line being demodulated with the spatially corresponding, raw binary picture elements previously recovered for the immediately preceding scan line.

For that reason, a balance is struck between the competing goals of maximizing the data compression and limiting the inter-scan line propagation of decoding errors. In keeping with that objective, one input of the difference detector 42 is connected to receive the raw binary picture elements for the so-called current scan line directly from the output or final stage of the shift register 45. However, the raw binary picture elements for the preceding scan line are gated from the output or final stage of the shift register 47 to the other input of the detector 42 via the AND gate 43 which, as previously mentioned, is periodically disabled by the line counter 44. To perform the gating function, the AND gate 43 has one input coupled to the output of the shift register 47, another input coupled to the output of the line counter 44, and an output coupled to the second input of the difference detector 42.

Figure 4:
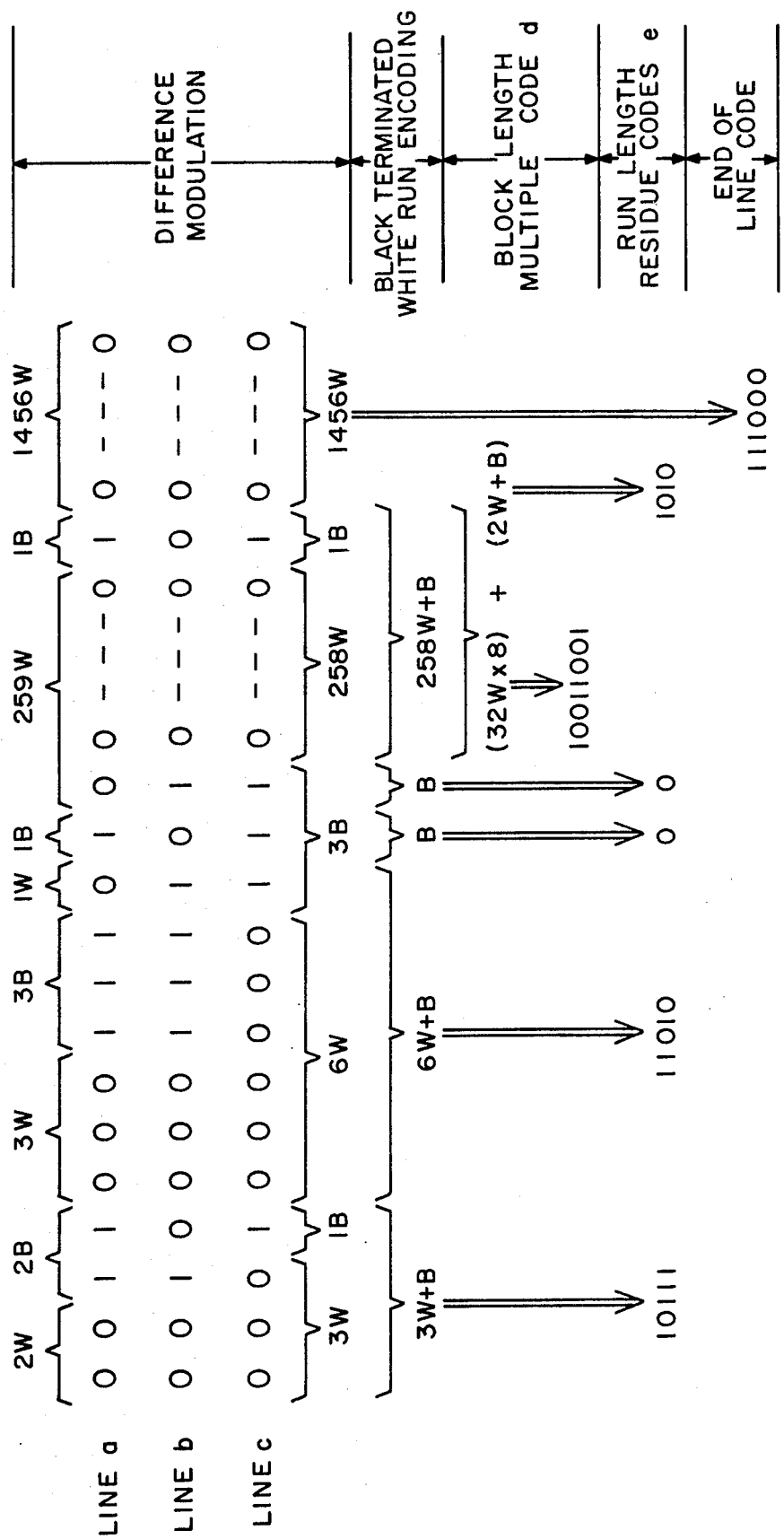
FIG. 4 is a simplified encoding chart illustrating the operation of the encoder shown in FIG. 3.

Functionally reviewing the difference modulator 31, it will be understood that the difference detector 42 generates a binary output signal representing the modulo-2 difference between input signals received from the AND gate 43 and the shift register 45. Raw binary picture elements for a current scan line are serially shifted out of the shift register 45 during the passive portion of each scanning cycle. However, the AND gate 43 is disabled throughout the first scanning cycle by a low ("0") logic level input signal supplied by the shift register 47. Consequently, the raw binary picture elements for the initial scan line are regenerated at the output of the detector 42 during the passive portion of the first cycle. In contrast, as shown in FIG. 4, spatially corresponding picture elements for a current span line *a* and an immediately preceding scan line *b* are fed in parallel from the shift registers 45 and 47, respectively, during the passive portion of each subsequent scanning cycle. Therefore, the difference detector 42 responds by generating a scan line *c* of difference modulated picture elements, unless the AND gate 43 is disabled by the line counter 44.

As will be recalled, the line counter 44 periodically disables the AND gate 43 to limit the inter-scan line propogation of decoding errors. For that purpose, the line counter 44 suitably comprises a multi-stage ring counter 48 which has its last stage coupled to an input of the AND gate 43 via an inverter 49. Typically, the ring counter 48 is reset or cleared at the outset of each scanning operation in response to the aforementioned start of scan signal and is thereafter incremented once each scanning cycle in response to, say, an end of scan line signal provided by the input scanner 16 at the conclusion of the active portion of each scanning cycle. In that event, there is a recirculating high ("1") logic level pulse with advances from stage-to-stage of the ring counter 48 at the line scanning rate, thereby causing the inverter 49 to supply a low ("0") logic level signal for disabling the AND gate 43 during one out of every predetermined number of scanning cycles. As a result, the difference detector 42 is periodically inhibited from receiving the picture elements for the so-called preceding scan line from the shift register 47. In effect, therefore, the detector 42 is cyclically switched between operating in a modulating mode and a non-modulating mode to generate a recurring sequence of a predetermined number of scan lines of difference modulated picture elements followed by a scan line of raw or unmodulated picture elements. As will be appreciated, decoding errors will not propogate through scan lines of unmodulated picture elements because those picture elements are recovered without referring to the picture elements for any other scan line. For example, if the ring counter 48 has five stages, a scan line of raw binary picture elements will be regenerated by the difference detector 42 during the passive portion of every fifth scanning cycle, thereby limiting the inter-scan line propogation of decoding errors to five scan lines at most, while still allowing for difference modulation of roughly eighty percent of the picture elements.

To compress the delta modulated and unmodulated picture elements furnished by the delta modulator 31, the encoder 32 comprises a memory means 51 which is selectively addressed by means including a binary run length counter 52 and a binary picture element 53 to serially convert (a) black terminated white runs into corresponding run length message codes, (b) unterminated white runs into corresponding end of line message codes, and (c) non-terminating black picture elements into individual message bits of a predetermined logic level. There is no need to distinguish between the difference modulated and unmodulated picture elements while processing black terminated white runs and non-terminating black picture elements. Instead, an adequate scan line-by-scan line indication of whether the picture elements are difference modulated or not is obtained merely by employing different end of line message codes for encoding the unterminated white runs of difference modulated and unmodulated picture elements.

Preferably, the run length message codes, the end of line message codes, and the individual message bits are mutually exclusive so that the boundaries therebetween are self-identifying, even after they have been assembled into a serial video data stream by the encoder 32. For that reason, as indicated in FIG. 4, each run length and end of line message code is selected to have an initial bit of the opposite logic level from the message bits and a unique bit sequence differing from the prefixes of all other codes. Of course, those guidelines are consistent with the use of so called tree codes viz., variable length (i.e., bit count) run length message codes. Thus, it should be recalled that the basic Huffman rule for taking advantage of variable length run length message codes is that the code assigned to any given run length should be no longer than the code assigned to any less probable run length. The implications of the Huffman rule have already been discussed and, therefore, need not be restated at this point.

Black terminated white runs and non-terminating black picture elements can be generically classified as being black terminated sequences of one or more picture elements. In recognition of that, the run length counter 52 serially generates fixed length binary counts which numerically represent the number of picture elements within successive ones of any black terminated sequences of difference modulated or unmodulated picture elements appearing at the output of the difference modulator 31. The bits of each of these counts are fed in parallel to the memory means 51 via a gate 55 and on address bus 56, thereby serially supplying address codes for reading out of the memory means 51 the run length message codes and the individual message bits called for by the black terminated white runs and the non-terminating black picture elements, respectively. Assuming again that there are 1728 picture elements/scan line, a 12 bit binary count is a suitable format for the address codes. Indeed, it will be understood from the subsequent discussion that the 12th bit is included in this particular case merely to simplify the address interface of the memory means 51 inasmuch as eleven bits are ample to uniquely define any count up to and including 1728 - viz., the 11 bit binary equivalent of 1728 is 11011000000 and the 12 bit equivalent is 011011000000.

For converting any black terminated difference modulated and unmodulated picture element sequence appearing at the output of the difference modulator 31 into a corresponding binary count-like address code, the run length counter 52 is synchronously reset or cleared at the conclusion of the active portion of each scanning cycle in response to, say, the aforementioned end of scan line signal furnished by the input scanner 16 and is incremented during the passive portion of each scanning cycle in response to the read clock pulses supplied by the controller 33. Furthermore, a black level detector 57 monitors the logic level of the picture elements which are fed from the delta detector 42 in response to the read clock pulses, thereby providing an asynchronous control signal which causes the controller 33 to sequentially enable the gate 55 and then reset the counter 52 whenever a black (e.g., a high ("1") logic level) difference modulated or unmodulated picture element is detected at the output of the difference detector 42.

Accordingly, it will be evident that the run length counter 52 generates successive binary counts and that a new count is started not only with the appearance at the output of the difference detector 42 of the initial picture element of each scan line, but also with the appearance of the first picture element following each black picture element. The read clock pulses increase the count accumulated by the counter 52 by one for each white (low ("0") logic level) and each black (high ("1") logic level) difference modulated or unmodulated picture element which is fed from the difference detector 42. Normally, the gate 55 is opened or disabled, thereby isolating the counter 52 from the memory means 51. However, when the level detector 57 detects the presence of a black modulated or unmodulated picture element at the output of the difference detector 42, the controller 33 enables or closes the gate 55 so that the bits defining the count accumulated by the counter 52 at that time are fed in parallel through the address bus 56 to address the memory means 51. Thereafter, the controller 33 resets the counter 52 prior to supplying the next read clock pulse so that a new count starts when the next picture element is fed from the difference detector 42. As will be appreciated, if the normal interval between successive read clock pulses fails to allow sufficient time for sequentially addressing the memory means 51 and then resetting the counter 52, provision may be made within the controller 33 for delaying the next read clock pulse upon the appearance of a black picture element at the output of the detector 42.

Similarly, to convert the unterminated runs of white (low ("0") logic level) picture elements appearing at the output of the modulator 31 into appropriate address codes for reading the preassigned end of line message codes out of the memory means 51, the picture element counter 53 is cleared or reset at the conclusion of the active portion of each scanning cycle in response, for example, to the end of scan line signal furnished by the input scanner 16 and is incremented during the passive portion of each scanning cycle in response to the read clock pulses supplied by the controller 33. Again, there is a normally opened or disabled gate 58, which is coupled between the output of the counter 53 and the address bus 56, for isolating the counter 53 from the memory means 51 until an unterminated white run is detected. However, the detection function is performed inferentially in reliance on an assumption that each scan line will conclude with one or more white picture elements. Specifically, to carry out the unterminated white run detection function, there is a decoder 59, which is coupled between the output of the counter 53 and a control input of the gate 58, for enabling or closing the gate 58 whenever the counter 53 accumulates a predetermined binary count equal to the number of picture elements alotted to each scan line. For example, if there are 1728 picture elements/scan line, the decoder 59 is selected to enable or close the gate 58 in response to the binary equivalent count of 11011000000 from the picture element counter 53.

As will be recalled, unterminated white runs of difference modulated and unmodulated picture elements advantageously are represented by different end of line message codes. Consequently, to provide address codes whch distinguish between those two cases, the bits supplied by the picture element counter 53 are supplemented by an additional bit having a logic level which depends on whether modulated or unmodulated picture elements are being fed from the difference modulator 31. As shown, the additional or supplemental bit suitably is derived from the output of the line counter 44 and typically is assembled at the input of the gate 58 in parallel with the bits defining the binary count accumulated by the counter 53. An 11 bit binary count from the counter 53 is sufficient to express the binary equivalent of the assumed allottment of 1728 picture elements/scan line. Hence, it will be understood that the supplemental bit may be added to form a 12 bit address code, without exceeding the twelve bit capacity of the address bus 56.

In view of the organization of the memory means 51, as described hereinbelow, the supplemental bit preferably occupies one of the more sigificant bit positions of the end of line address codes, although that means that there is a potential conflict with an address code (011011000000) which represents a black terminated picture element sequence comprising a full scan line of difference modulated or unmodulated picture elements. Thus, to avoid the conflict, there is a code converter 60 with a built in delay connected between the gate 58 and the address bus 56 for converting the end of line address codes to non-conflicting bit sequences (e.g., 011011100000 and 0111111000000) and for delaying the application of the end of line address codes for a period of time sufficient to allow for priority handling of all run length address codes.

Referring to the memory means 51, it is noted that provision is made for extracting variable length data from fixed length data bytes or words. While this feature is generally applicable to the storage of variable length data in and the retrieval of such data from a word oriented memory, a description of a specific application adequately discloses the broad underlying concept. Here, of course, the application of special interest involves the storage and recovery of the run length message codes, the individual message bit, and the end of line message codes from which a compressed video signal is constructed.

Focusing on that application, it will be seen that there is a stripper circuit 61 for extracting the run length message codes, the individual message bits, and the end of line message codes for the compressed video signal from fixed length data words under the control of fixed length control words. The data words and control words are read out of first and second word oriented memory banks 62, 63 and 64, 65, respectively, by the address codes which are generated in response to the black terminated picture element sequences and the unterminated white runs. Thus, the stripper circuit 61 is provided with a predetermined data word and control word for each such sequence and run. The data word contains the message code or bit representing the particular black terminated picture element sequence or unterminated white run and the control word distinguishes between the relevant and irrelevant bits of the data word, thereby enabling the stripper circuit 61 to extract the message code or bit from the data word.

More particularly, the run length message codes, the individual message bit, and the end of line message codes are contained by separate data words. As shown, there is a set of read only memories (ROMs) 62 and 63 for storing those data words at different, predetermined addresses or storage locations. The data word length is selected to at least equal the longest of the message codes, and each of the data words is organized so that the relevant bits (i.e., those defining the message code or message bit) precede any irrelevant, filler bits (e.g., low ("0") logic level bits) which are included merely to achieve the selected word length. Furthermore, the storage locations for the data words are selected on the basis of the address codes so that the data word containing the appropriate message code or message bit for any given black terminated picture element sequence or unterminated white run is selectively read out of the memory bank 62, 63 in response to the address code which is generated as a result of that particular sequence or run.

For distinguishing between the relevant bits and the filler bits of the data words, there are an equal number of control words. The control words are stored within another set of ROMs 64 and 65 at addresses or storage locations which are selected so that each control word is associated with a respective one of the data words by virtue of sharing a common address code. Hence, each control word is responsible for distinguishing between the relevant and irrelevant bits of its associated data word. For example, one way in which such a distinction can be made is to select each control word to have high ("1") and low ("0") logic level bits positionally corresponding with the relevant and irrelevant bits, respectively, of the associated data word.

In operation, the address codes generated in response to the black terminated picture element sequences and the unterminated white runs are sequentially applied in parallel to the first and second memory banks 62, 63 and 64, 65, respectively, whereby successive sets of associated data words and control words are sequentially read out in parallel and applied in parallel to the stripper circuit 61. The stripper circuit 61, in turn, relies on the control words for extracting the run length message codes, the individual message bits, and the end of line message codes from the data words, thereby serially constructing the compressed video signal. To perform that function, the stripper circuit 61 suitably comprises a gate controlled parallel input/serial output shift register or the like (not shown) for serially shifting out the relevant bits of the data words in response to read clock pulses received from the controller 33 via a gate (also not shown) which is selectively enabled and disabled under the control of the control words. In that event, the shift register is cleared in preparation for extracting the relevant bits from each of the successive data words.

For conserving on the storage capacity required of the memory banks 62, 63, and 64, 65, a block length multiple plus run length residue code format is utilized in encoding the black terminated white runs of difference modulated and unmodulated picture elements. The advantage of that format is, as shown in FIG. 4, that black terminated white runs in excess of a predetermined block length are represented by a block length multiple code $d$ plus, if the run happens to be a noninteger multiple of the block length, a run length residue code $e$. Shorter runs are, on the other hand, represented solely by a run length residue code $e$. In other words, the block length multiple plus run length residue code format avoids the necessity of having a separate data word and control word for each of the possible black terminated white run lengths.

To carry out the encoding of the black terminated white runs in accordance with a block length multiple plus run length residue code format, the address bus 56 is split to furnish a first branch 56a for routing the more significant bits of the basic twelve bit address codes to the ROMs 62 and 64 and a second branch 56b for routing the less significant bits of the address codes to the ROMs 63 and 65. The data words and the control words for the block length multiple codes are stored within and read out from the ROMs 62 and 64, respectively, as previously described. Similarly, the ROMs 63 and 65 are used to accommodate the data words and the control words, respectively, for the run length residue codes. Sequencing of the block length multiple and the run length residue codes is accomplished by delaying the read out of the data word and control word for one of the other of those codes. Here, for example, provision (schematically illustrated at 66 and 67) is made for delaying the read out of the data word and control word for the run length residue code, whereby the stripper circuit 61 first extracts any block length multiple code $d$ that is called for before turning to any run length residue code $e$.

A practical block length for the illustrated embodiment is 32 picture elements long. For that particular case, the seven most significant bits of each twelve bit address code are applied in parallel to the ROMs 62 and 64 to derive the block length multiple codes for the integer multiplies of 32 (i.e., the sums of anyone or more of the binary place values of 32, 64, 128, 256, 512 and 1,024). The other or five least significant bits of each address code are applied in parallel to the ROMs 63 and 65 to derive the run length residue codes. To complete this example, it should be noted that the address codes which are here provided in response to the unterminated white runs lead to the use of the ROMs 62 and 64 for storing the data words and control words, respectively, from which the end of line message codes are derived. Likewise, the specific address code that is generated in response to a non-terminating black picture element dictates that the data word and control word dedicated to the individual message bit be stored within the ROMs 63 and 65, respectively.

CONCLUSION

In view of the foregoing, it will now be understood that this invention provides methods and means for performing truncated run length encoding of fractionally difference modulated video signals.

What is claimed is:

1. In combination with raster scanning means for converting the information content of a subject copy into a binary video signal having a predetermined number of serial picture elements for each of a plurality of successive scan lines and including black and white picture elements of opposite logic levels; the improvement comprising a data compressor for compressing said video signal; said data compressor including modulating means for generating a binary output signal representing the modulo-2 difference between first and second binary input signals, serial input/parallel output means for serially accumulating said picture elements and for supplying spatially corresponding picture elements for successive pairs of adjacent scan lines in parallel, circuit means coupled between a first output of said serial input/parallel output means and a first input of said modulating means for applying the picture elements for one of each pair of scan lines to said modulating means, gate means coupled between a second output of said serial input/parallel output means and a second input of said modulating means for selectively applying the picture elements for the other scan line of certain ones of said pairs to said modulating means, line counter means for applying a control signal to a control input of said gate means for cyclically enabling and disabling said gate means at a rate selected to suppress the picture elements for at least one out of every predetermined number of said pairs of scan lines, memory means for storing two distinct end of line message codes at different, predetermined addresses, picture element counter means for accumulating a binary count representing an intra-scan line running picture element count, normally open gate means for normally isolating said memory means from said line counter means and said picture element counter means, and decoder means coupled between said picture element counter means and said normally open gate means for closing said gate means when said running count reaches said predetermined number of picture elements, whereby said memory means is addressed to selectively read out one and the other of said end of line message codes upon concluding each scan line of modulated and unmodulated picture elements, respectively.

2. The improvement of claim 1 wherein said serial input/parallel output means comprises multi-stage shift register means, and clock means are coupled to said shift register means and to said picture element counter means to supply read clock pulses for simultaneously shifting spatially corresponding picture elements out of said shift register means and incrementing said picture element counter means.

3. The improvement of claim 1 wherein preselected run length message codes and a preselected individual message bit are also stored in said memory means at further predetermined addresses, run length counter means are also incremented in response to said clock pulses, another normally open gate means is coupled between said run length counter means and said memory means, means are included for synchronously clearing said picture element counter means and said run length counter means in preparation for each of said successive scan lines, detector means monitor the logic level of the modulated and unmodulated picture elements provided by said modulated means for supplying a control signal in response to each black modulated picture element and each black unmodulated picture element, and control means asynchronously and sequentially close said other normally open gate means and then clear said run length counter means in response to said control signal, whereby said memory means is addressed to selectively read out appropriate ones of said run length message codes in response to any black terminated intra-scan line runs of white picture elements and said individual message bit in response to any non-terminating black picture elements, and the only distinction between scan lines of modulated and unmodulated picture element is provided by said end of line message codes.

4. The improvement of claim 3 wherein said serial input/parallel output means comprise multi-stage shift register means clock means are coupled to said shift register means, said picture element counter means and said run length counter means to supply read clock pulses for incrementing said picture element counter means and said run length counter means while shifting spatially corresponding picture elements for adjacent scan lines out of said shift register means.

5. The improvement of claim 4 wherein said raster scanning means operates cyclically in an active and passive mode, said clock means additionally supplies write clock pulses which are applied to said shift register means while said raster scanning means is operating in its active mode to serially shift said picture elements into said shift register means, and said read clock pulses are supplied while said raster scanning means is operating in its passive mode, whereby said video signal is compressed scan line-by-scan line during passive portions of successive scanning cycles.

6. The improvement of claim 5 wherein said end of line message codes, said run length message codes, and said individual message bits are unique and of variable length, said memory means is word oriented, and data stripping means are coupled to said memory means for extracting said end of line message codes, said run length message codes, and said individual message bit from fixed length bytes read out of said memory means.

7. A method for compressing a binary video signal having a predetermined number of serial picture elements for each of a plurality of successive scan lines and including black and white picture elements of opposite logic levels; said method comprising the steps of converting picture elements for selected ones of said scan lines into modulated picture elements representing the modulo-2 difference between the picture elements for the selected scan line and the spatially corresponding picture elements for an immediately proceeding scan line, retaining unmodulated picture elements for other of said scan lines, converting black terminated intra-scan line runs of white picture elements and non-terminating black picture elements into corresponding run length message codes and individual message bits, respectively, without distinguishing between modulated and unmodulated picture elements, and converting unterminated intra-scan line runs of white picture elements into end of line message codes, using one code for runs of modulated picture elements and another code for runs of unmodulated picture elements, whereby said end of line message codes distinguish between scan lines of modulated and unmodulated picture elements.

8. The method of claim 7 wherein the conversion of said picture elements is periodically interrupted to retain at least one scan line of unmodulated picture elements for each predetermined number of scan lines of modulated picture elements, thereby limiting inter-scan line propagation of any decoding errors.

9. The method of claim 7 wherein the steps of converting said black terminated runs of white picture elements, said non-terminating black picture elements, and said non-terminating runs of white picture elements involve generating address codes to selectively read said run length message codes, said individual message bit, and said end of line message codes out of a memory.

* * * * *